United States Patent
Ismeier et al.

(10) Patent No.: US 6,699,950 B1
(45) Date of Patent: Mar. 2, 2004

(54) CATIONIC POLYMERIZATION PROCESS AND CATALYST SYSTEM THEREFOR

(75) Inventors: Juergen Ismeier, Forstinning (DE); Carsten Kreuder, Brasschaat (BE); Oskar Nuyken, Munich (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/869,601

(22) PCT Filed: Dec. 30, 1999

(86) PCT No.: PCT/CA99/01236

§ 371 (c)(1),
(2), (4) Date: Aug. 30, 2001

(87) PCT Pub. No.: WO00/40624

PCT Pub. Date: Jul. 13, 2000

(30) Foreign Application Priority Data

Dec. 31, 1998 (CA) ................................. 2257701

(51) Int. Cl.[7] .............. C08F 2/14; C08F 4/14; C08F 210/10; C08F 232/00; C08F 236/00
(52) U.S. Cl. ............ 526/237; 526/308; 526/280; 526/281; 526/284; 526/348.6; 526/348.7; 526/283; 526/337; 526/339
(58) Field of Search ................. 526/237, 308, 526/280, 281, 284, 348.7, 348.6, 283, 337, 339

(56) References Cited

U.S. PATENT DOCUMENTS

| 2,356,128 A | 8/1944 | Thomas et al ................ 260/79 |
| 3,808,177 A | 4/1974 | Thaler et al ................ 260/80.7 |
| 3,856,763 A | 12/1974 | Thaler et al ................ 260/80.7 |
| 3,923,759 A | * 12/1975 | Kennedy et al. ............ 260/88.2 |
| 4,031,300 A | 6/1977 | Thaler et al. ................ 526/308 |
| 4,057,681 A | 11/1977 | Gorbaty ..................... 526/185 |
| 4,139,695 A | 2/1979 | Thaler et al. ................ 526/308 |
| 5,883,207 A | 3/1999 | Youn et al. .................. 526/185 |

FOREIGN PATENT DOCUMENTS

| EP | 0 391 697 | 10/1990 |
| WO | WO97/05181 | * 2/1997 |

OTHER PUBLICATIONS

J. Macromol. Sci. Chem. A1(6), Oct. 1967, pp. 977–993, J.P. Kennedy, S. Bank and R.C. Squires, Contributions to the Mechanism of Isobutene Polymerization. VI. Effect of Halides.

* cited by examiner

*Primary Examiner*—Roberto Rabago
(74) *Attorney, Agent, or Firm*—Joseph C. Gil; Jennifer R. Seng; Noland J. Cheng

(57) ABSTRACT

A process for producing a copolymer of an isoolefin and at least one other comonomer comprising the step of polymerizing a reaction mixture comprising an isoolefin, a catalyst and at least one of a cycloconjugated muitiolefin and an unconjugated cyclic olefin in the presence of an activator comprising a carbo cation producing species, a silica cation producing species and mixtures thereof. The process can be practiced using a slurry polymerization approach. One of the main benefits achieved with the present invention is the conversion of the monomers over a shorter period of time and higher percent conversion than when the activator is not used.

35 Claims, No Drawings

CATIONIC POLYMERIZATION PROCESS AND CATALYST SYSTEM THEREFOR

BACKGROUND OF THE INVENTION

1. Field of the Invention

The present invention relates to an improved cationic polymerisation process and a catalyst system therefor.

2. Description of the Prior Art

Polymers and copolymers of isobutylene are well known in the art. In particular, copolymers of isobutylene with conjugated muitiolefin have found wide acceptance in the rubber field. These polymers are generally termed in the art butyl rubber. The preparation of butyl rubber is described in U.S. Pat. No. 2.356,128 (Thomas et al.), the contents of which are incorporated herein by reference.

The term butyl rubber as used throughout this specification is intended to encompass copolymers made from the polymerization of a reaction mixture comprising an isoolefin having from 4 to 7 carbon atoms (e.g., isobutylene) and a conjugated multiolefin having from 4 to 14 carbon atoms (e.g., isoprene). Although these copolymers arc said to contain about 0.2 to about 15% combined multiolefin, in practice the butyl rubber polymers of commerce contain from about 0.6 to about 4.5 wt % of multiolefin; more specifically from about 0.1 to about 2 mole %, the remainder of the polymer being comprised of the isoolefin component.

Efforts to prepare isoolefin-multiolefin polymers of higher unsaturation have met with varying degrees of success. Where substantially gel-free polymers have been prepared containing more than about 5% multiolefin, the polymers have been of low number average molecular weight. This has been true even where these polymers had high viscosity average molecular weights. In general, however, the products formed by prior art processes either high in gel content or low in number average molecular weight are of little utility. In order to have practical commercial utility as a synthetic butyl rubber, the isobutylene-isoprene copolymers must be substantially gel-free and have a number average molecular weight of at least 120,000.

The problem associated with the relatively low unsaturation content of conventional butyl rubber is the correspondingly low number of crosslinking sites which can bond with another rubber. Also, the crosslinking behaviour of conventional butyl rubber is different than that of other highly unsaturated rubber. These properties of conventional butyl rubber result in a weak adhesive strength which is further decreased when exposed to external shock, vibration and the like.

Thus, isobutene-cyclopentadicnc copolymer has been proposed in the prior art as an alternative to conventional butyl rubber. Isobutene-cyclopentadiene copolymer has an improved adhesive strength as well as excellent gas barrier properties, even at high degrees of unsaturation. Further, while the unsaturation of the cyclopentadiene moiety in the copolymer is susceptible to attack by ozone and the like, since the unsaturation is pendant to the polymer backbone (i.e., it does not form part of the polymer backbone), the polymer backbone remains substantially unaffected. Thus, the aging properties of a vulcanizate made from the copolymer arc excellent and its improved other characteristics make it highly desirable for use in tires.

The general problem with prior art isobutene-cyclopentadiene copolymers is in the production thereof; particularly in commercial quantities. The specific problems include one or both of the following:

(i) maintaining the stability of the cyclopentadiene co-monomer for a period sufficient to effect co-polymerization (the co-monomer is normally unstable against heat);

(ii) as the degree of unsaturation increases, there is an increase in gel formation and a decrease in the molecular weight (Mw) of the copolymer.

The latter problem can be addressed by using a conventional solution polymerization approach. See, for example, one or more of:

U.S. Pat. No. 3,808,177 (Thaler et al.);

U.S. Pat. No. 3,856,763 (Thaler et al.)

U.S. Pat. No. 4,031,300 (Thaler et al.); and

U.S. Pat. No. 4,139,695 (Thaler et al.); the contents of which are hereby incorporated by reference.

The use of a solution polymerization approach to produce an isobutene-cyclopentadiene copolymer has been criticized in International Publication Number WO 97/05181 (Youn el al.), the contents of which are hereby incorporated by reference—see, for example, page 3, line 2 to page 4, line 20 of Youn et al. Indeed, the purported point of novelty taught by Youn et al. relates to a slurry polymerization approach.

Notwithstanding the prior art solution and slurry polymerization approaches for the production of isobutene-cyclopentadiene copolymers, there is still room for improvement. Specifically, it would be desirable to have a polymerization process for the production of an isobutene-cyclopentadiene copolymer which could be used with a slurry approach to produce a low (or negligible) gel content copolymer at relatively high conversion rates of the cyclopentadiene comonomer in a shortened period of time, thus improving catalyst efficiency which is low compared to state of the art butyl polymerizations.

SUMMARY OF THE INVENTION

It is an object of the present invention to obviate or mitigate at least one of the above-identified disadvantages of the prior art.

It is another object of the present invention to provide an improved catalyst system for isoolefin copolymerization and terpolymerization.

It is another object of the present invention to provide an improved process for isoolefin copolymerization and terpolymerization.

Accordingly, in one its aspects, the present invention provides a slurry process for producing a copolymer of an isoolefin and at least one other comonomer comprising the step of polymerizing a reaction mixture comprising an isoolefin a catalyst and at least one of a cycloconjugated multiolefin and an unconjugated cyclic olefin in the presence of an activator comprising a carbo cation producing species, a silica cation producing species and mixtures thereof.

Thus, the present inventors have surprisingly and unexpectedly discovered that the use of a specific activator in this cationic polymerization process surprisingly and unexpectedly improves the process by exhibiting an improved conversion in less time while maintaining a desirable Mw. This is indeed surprising given the teachings of Kennedy et al. (*J. Macromol. Sci. Chem.* A1(6). p. 977–993 (1967), the contents of which are hereby incorporated by reference) wherein tert-butyl chloride was used as chain transfer agent and resulted in a decrease of Mw. The present process is characterized by lack of a significant decrease of Mw, especially when the process is conducted in semi-batch mode.

One of the main benefits achieved with the present invention is the conversion of the monomers over a shorter period of time and higher percent conversion than when the activator is not used. Further, one or more of the following advantages may also accrue:

1. high conversion of a second comonomer in a shortened period of time;
2. a low or negligible gel content;
3. the ability to achieve useful results at temperatures in the range of from about −110° C. to about −80° C.;

Other advantages will be apparent to those of skill in the art.

DETAILED DESCRIPTION OF THE PREFERRED EMBODIMENTS

The invention relates to a method of preparing a copolymer of an isoolefin and at least one of a cycloconjugated multiolefin and an unconjugated cyclic olefin. Of course, those of skill in the art will recognize that the products of the present process may be at least any one of: a copolymer of an isoolefin and a cycloconjugated multiolefin; a copolymer of an isoolefin and an unconjugated cyclic olefin; a terpolymer of an isoolefin, a cycloconjugated multiolefin and an unconjugated cyclic olefin; a terpolymer of an isoolefin and two (or more) different cycloconjugated multiolefins; and a terpolymer of an isoolefin and two (or more) different unconjugated cyclic olefins.

Preferably, the copolymer has a number average molecular weight about 30,000 to about 600,000, more preferably about 50,000 to about 400,000, still more preferably about 70,000 to about 350,000 and a mole % unsaturation of at least about 1 to about 45 mole %, more preferably at least about 1 to about 40 mole %, and most preferably the unsaturation is about 2–25%.

Preferably, the isoolefin suitable for use in the present process is a $C_4$–$C_{10}$ hydrocarbon monomer. Non-limiting examples of suitable isoolefin may be selected from the group comprising isobutylene, 2-methyl-1-butene, 3-methyl-1-butene, 4-methyl-1-pentene and mixtures thereof. The preferred isoolefin is isobutylene.

Preferably, the cycloconjugated multiolefin suitable for use in the present process is a $C_5$–$C_{20}$ hydrocarbon monomer having at least one pair of conjugated double bonds. The monomer may comprise a 5-membered ring structure. Non-limiting examples of suitable monomers including such a ring structure may be selected from the group comprising cyclopentadiene, 1-methylcyclopentadiene, 2-methylcyclopentadiene, 1,3-dimethylcyclopentadiene and mixtures thereof. Further, the monomer may comprise a 6-membered ring structure comprising a conjugated diene. Non-limiting examples of suitable monomers including such a ring structure may be selected from the group comprising 1,3-cyclohexadiene, 1-methyl-1,3-cyclohexadiene, 1-methylene-2-cyclohexene, 2-methyl-1,3-cyclohexadiene, 1,3-dimethyl-1,3-cyclohexadiene and mixtures thereof.

Indene and its derivatives may also be used.

Preferably, the unconjugated cyclic olefin suitable for use in the present process is a bicyclic containing an unsaturated bond. Non-limiting examples of suitable such monomers may be selected from the terpenes—e.g., β-pinene.

In a preferred embodiment, terpolymers of an isobutylene, a cyclo-conjugated diolefin and a third monomer (e.g., unconjugated terpenes) can be prepared according to the method embodied by the present process wherein these terpolymers have a number average molecular weight (Mn) of about 30,000 to about 600,000, more preferably about 50,000 to about 400,000 and stiff more preferably about 70,000 to about 350,000; and a mole % unsaturation of cyclopentadiene at least 1 to about 45 mole %, more preferably at least 1 to about 25 mole The total unsaturation from all comonomers and cyclopentadiene is preferably between 1 and 45 mole %, more preferably between 1 and 40 mole %, and most preferably between 1 and 30 mole %.

It is possible and preferred to practice the present process using a slurry polymerization approach. As is known in the art, the use of a slurry polymerization allows for higher conversions than for solution polymerization (e.g., 90% to 95% or more) without a concurrent increase in viscosity in the reaction mixture.

The slurry polymerization approach utilizes a diluent which is a non-solvent for the polymer product. The choice of diluent is within the purview of those of skill in the art. Preferably, the diluent is a polar diluent. The term polar diluent as used in the specification and claims, means liquids having a dielectric constant at 25° C. of less than about 20, more preferably less than about 17, most preferably less than about 10. These liquids however, preferably do not contain sulfur, oxygen or phosphorus in the molecule since compounds containing these elements will react with or otherwise deactivate the catalyst.

The preferred polar diluents are inert halogenated aliphatic hydrocarbons, more preferably halogenated paraffinic hydrocarbons and vinyl or vinyl idene halides, most preferably primary or secondary chlorinated paraffinic hydrocarbons. The term inert means that the cosolvent will not react with the catalyst or otherwise enter into the polymerization reaction. The halogenated hydrocarbon is preferably a $C_1$–$C_5$ paraffinic hydrocarbon, more preferably a $C_1$–$C_2$, paraffin. The ratio of carbon atoms to halogen atoms in the polar diluent is preferably 5 or less. Preferably the halogen is chlorine.

Illustrative examples of these polar diluents are methylchloride, ethyl chloride, propyl chloride, methyl bromide, ethyl bromide, chloroform, methylene chloride, vinyl chloride, vinylidine chloride, dichloroethylene, etc. Preferably, the polar diluent is methyl chloride or ethyl chloride.

When using the slurry polymerization approach, any of the catalysts discussed above with respect to the solution polymerization approach may be used In the practice of this invention, a catalyst is used. Preferably, in the slurry polymerization approach, the catalyst has the formula $AlY_3$ wherein Y is a halogen. The most preferred catalyst for use in the slurry approach is $AlCl_3$. However, the use of aluminum catalysts in Ziegler-Natta polymerization process is well known and alternative choices of aluminum catalyst to he used in the present process are within the purview of a person skilled in the art. For example, the aluminum catalyst may comprise at least one compound having the formula:

$$(R)_p AlY_q$$

wherein R is selected from the group comprising a $C_2$–$C_{10}$ alkyl group, a $C_2$–$C_{10}$ alkoxyl group and a $C_3$–$C_{20}$ cycloalkyl group, Y is a halogen and p+q is 3. More preferably, q is not 0. Possibly, the aluminum catalyst comprises a mixture of at least two of said compounds.

Preferably, p is a number in the range of from about 1 to about 2, and q is a number in the range of from about 1 to about 2. In a more preferred embodiment, p is 2 and q is 1. In another more preferred embodiment, p and q are 1.5. In yet another more preferred embodiment, p is 1 and q is 2.

Preferably, R is ethyl.

Of course, the halogen Y in the preferred formula for the aluminum catalyst may be selected from the group comprising bromide, chloride, iodide and astatine. The preferred halogen moiety is chloride. If two or more halogen moieties are present on the aluminum catalyst, it is preferred that they be the same.

Non-limiting examples of aluminum catalysts useful in the present invention may be selected from the group comprising diethyl aluminum chloride, ethyl aluminum dichloride, ethyl aluminum sesquichloride, methyl diethoxy aluminum, methylalumninum dichloride, isobutylaluminum dichloride, methylalumninum dibromide, ethylaluminum dibromide, benzylaluminum dichloride, phenylaluminum dichloride; xylylaluminum dichloride, toluylaluminum dichloride, butylaluminum dichloride, hexylaluminum dichloride, octylaluminum dichloride, cyclohexylaluminum dichloride and mixtures thereof. The preferred catalysts are methylaluminum dichloride, ethylaluminum dichloride, isobutylaluminum dichloride, dimethylaluminum chloride, diethylaluminum chloride, diisobutylaluminum chloride and mixtures thereof. As is known to those of skill in the art, if it is desired to utilize ethyl aluminum sesquichloride as the aluminum catalyst, it is possible to produce the cocatalyst by mixing equimolar amounts of diethyl aluminum chloride and ethyl aluminum dichloride.

Where an aluminum halide is used, it is preferably in the form of an homogeneous solution or submicron dispersion of catalyst particles, e.g., colloidal dispersion. Therefore, the catalyst is preferably dispersed or dissolved in a suitable catalyst solvent or mixtures of solvents. The catalyst solvent preferably is a polar solvent.

It is preferred the aluminum halide catalyst be in solution in the polar organic solvent prior to introduction of the catalyst to the reaction medium.

Use of the term solution with reference to the polar organic solvent/aluminum halide systems is intended to include both true solution and colloidal dispersions since they may exist concurrently in the same system.

The aluminum halide/polar solvent catalyst preferably comprises about 0.01 to about 2 wt. % aluminum halide, more preferably about 0.01 to about 1, most preferably 0.04 to about 0.8.

The hydrocarbylaluminum dilialide catalyst may be added neat or in solution. Preferably where a catalyst solvent is used, it is a liquid paraffin solvent or cycloparaffin solvent. It is advantageous though not necessary to use paraffins of low freezing point. Methylcyclohexane is particularly useful since catalyst solutions of about 1% concentration do not freeze at −120° C.

The concentration of the catalyst is not critical. Very dilute catalyst solutions, however, are not desirable since substantial fractions of the catalyst may be deactivated by impurities. Very concentrated solutions are undesirable since at polymerization temperatures catalyst may be lost by freezing out of solution.

In carrying out the present process, those skilled in the art will be aware that only catalytic amounts of catalyst solution are required. Preferably, the volume ratio of monomer plus diluent to catalyst solution is about 100/1 to about 9/1, more preferably about 80/1 to about 10/1, most preferably about 50/1 to about 20/1.

It is desirable to conduct the reaction below about −80C, more preferably about 90C to 110C.

Specifically preferred embodiments of this slurry approach will be illustrated in the Examples hereinbelow. For more general information, see, for example, Youn et al., referred to and incorporated by reference hereinabove.

In the present process, use is made of an activator comprising a carbo cation producing species, a silica cation producing species and mixtures thereof.

Preferably, the activator is used in an amount in the range of from about 0.0005 to about 0.2, more preferably from about 0.001 to about 0.1, most preferably from about 0.002 to about 0.06, weight % based on the total weight of the monomers.

In one preferred embodiment, the activator is a carbon cation producing species having the formula:

wherein $R^1$ is a $C_1-C_{40}$ hydrocarbon, optionally substituted with one or more heteroatoms, and X is selected from the group comprising a halogen, —OH and —$OR^2$, wherein $R^2$ is the same or different as $R^1$ and is a $C_1-C_{40}$ hydrocarbon, optionally substituted with one or more heteroatoms. In one preferred embodiment, each of $R^1$ and $R^2$ is a $C_1-C_{40}$ straight chain or branched alkyl group, optionally having one or more unsaturations. In another preferred embodiment, each of $R^1$ and $R^2$ is a substituted or unsubstituted $C_5-C_{40}$ aryl group. In yet another embodiment, each of $R^1$ and $R^2$ is a substituted or unsubstituted $C_3-C_{40}$ cycloalkyl group. Preferably, X is selected from the group comprising Cl, Br and I.

The more preferred embodiments of X may be selected from the group comprising Cl, OH and $OCH_3$.

In another preferred embodiment, the activator has the formula:

wherein R is a $C_1-C_{40}$ hydrocarbon, optionally substituted with one or more heteroatoms, and $X^1$ and $X^2$ are the same or different and each is a halogen, —OH and —$OR^3$, wherein $R^3$ is a $C_1-C_{40}$ hydrocarbon, optionally substituted with one or more heteroatoms.

In one preferred embodiment, R is a $C_1-C_{40}$ straight chain or branched alkyl group, optionally having one or more unsaturations. In another preferred embodiment, R is substituted or unsubstituted $C_5-C_{40}$ aryl group. In yet another preferred embodiment, R is a substituted or unsubstituted $C_3-C_{40}$ cycloalkyl group.

In one preferred embodiment, $R^3$ is a $C_1-C_{40}$ straight chain or branched alkyl group, optionally having one or more unsaturations. In another preferred embodiment, $R^3$ is a substituted or unsubstituted $C_5-C_{40}$ aryl group. In yet another preferred embodiment, $R^3$ is a substituted or unsubstituted $C_3-C_{40}$ cycloalkyl group.

Preferably, $X^1$ and $X^2$ are selected from the group comprising Cl, Br and I, more preferably both $X^1$ and $X^2$ are Cl.

Non-limiting examples of activators which are useful in the present process as suitable carbo cation producing species include:

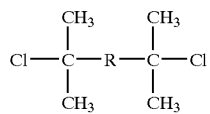

wherein R is $C_1-C_{40}$ hydrocarbon, optionally substituted with one or more heteroatoms,

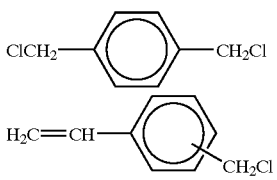

and cis and trans isomers of

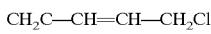

In another preferred embodiment, the activator may be selected from the group comprising allyl chloride, tert-butylehloride, benzyl chloride, 4-methylbenzyl chloride and mixtures thereof.

In another preferred embodiment, the activator is a silica cation producing species having the formula:

wherein $R^4$, $R^5$ and $R^6$ are the same or difference and each is a $C_1$–$C_{40}$ hydrocarbon, optionally substitute d with one or more peteroatoms and X a halogen. In one preferred embodiment, each of $R^4$, $R^5$ and $R^6$ is a $C_1$–$C_{40}$ straight chain or branched alkyl group, optionally having one or more unsaturations. In another preferred embodiment, each of $R^4$, $R^5$ and $R^6$ is a substituted or unsubstituted $C_5$–$C_{40}$ aryl group. In yet another preferred embodiment, each of $R^4$, $R^5$ and $R^6$ is a substituted or unsubstituted $C_5$–$C_{40}$ cycloalkyl group. Preferably, X is selected from the group comprising Cl, Br and I, more preferably X is Cl. A preferred non-limiting example of a silica cation producing species is trimethyl silyl halide.

Embodiments of the present invention will now be described with reference to the following Examples which should not be construed as limiting the scope of the invention.

EXAMPLE 1

At −30° C., 0.0267 g AlCl$_3$ (purity 99.99% <100 ppm H$_2$O) was dissolved in 55.4 mL methylchloride (<20 ppm H$_2$O) to form a catalyst solution. The solution was stirred for 30 minutes at −30° C. and then cooled down to −95° C.

In a 500 mL 3-necked reaction flask equipped with an overhead stirrer, a reaction mixture consisting of 0.66 g cyclopentadiene, 38.5 mL isobutene and 161 mL methylchloride was stirred at −95° C. The temperature of the mixture was brought to −93° C. and the catalyst solution was added at once to start the polymerization. All temperature changes during the reaction are followed by a thermocouple.

After 20 minutes, the reaction was stopped by addition to the reaction mixture of 3 mL of a solution of NaOH in ethanol (1.0 wt. %).

The polymerization was carried out in a Braun dry box under dry nitrogen atmosphere (<5 ppm H$_2$O, <20 ppm O$_2$).

Solvent, unreacted monomers and ethanol were removed under vacuum and the polymer yield was determined by gravimetry to be 16.3 wt. %.

By dissolving in hexane and reprecipitation from ethanol, the polymer was cleaned. After 3 days of drying in a vacuum oven at room temperature.the molecular weight, determined by GPC (UV-detection), was Mn=130000; Mw=195000, the cyclopentadiene content in the polymer was determined to 7.2 mol % by $^1$H-NMR.

This Example represents a control reaction without addition of an accelerator, and thus is provided for comparative purposes only.

EXAMPLE 2

The methodology of Example 1 was repeated except that the reaction mixture consisted of 1.65 g cyclopentadiene, 37 mL isobutene and 161 mL, methylchloride. The polymer yield was 13.9 wt. %, the molecular weight if Mn=53000; Mw=130000 and the cyclopentadiene content in the polymer was 17.9 mol %. This Example represents a control reaction without addition of an accelerator, and thus is provided for comparative purposes only.

EXAMPLE 3

The methodology of Example 1 was repeated except that the reaction mixture consisted of 0.81 g methylcyclopentadiene, 38.5 mL isobutene and 161 mL methylchloride. The polymer a yield was 49.0 wt. %, the molecular weight is Mn=57000; Mw=327000 and the methylcyclopentadiene content in the polymer was 4.0 mol %. This Example represents a control reaction without addition of an accelerator, and thus is provided for comparative purposes only.

EXAMPLE 4

The methodology of Example 1 was repeated except that the reaction consisted of 0.33 g cyclopentadiene, 0.40 g methylcyclopentadiene, 38.5 mL isobutene and 161 mL methylchloride. The polymer yield was 25.8 wt. %, the molecular weight was Mn=52000; Mw=182000, the cyclopentadiene content in the polymer was 2.8 mol % and the methylcyclopentadiene content in the polymer was 3.5 mol %. This Example represents a control reaction without addition of an accelerator, and thus is provided for comparative purposes only.

EXAMPLE 5

The methodology of Example 1 was repeated except that 9.3 mg tert-butylchloride were added to the reaction mixture before starting the reaction. The polymer yield was 77.4 wt. %, the molecular weight was Mn 47000; Mw=109000 and the cyclopentadiene content in the polymer was 2.9 mol %.

EXAMPLE 6

The methodology of Example 5 was repeated except that 18.6 mg tert-butylchloride was added to the reaction mixture before starting the reaction. The polymer yield was 98.5 wt. %, the molecular weight was Mn=37000; Mw=75000 and the cyclopentadiene content in the polymer was 1.9 mol %.

EXAMPLE 7

The methodology of Example 5 was repeated except that 4.6 mg tert-butylchloride was added to the reaction mixture before starting the reaction. The polymer yield was 50.3 wt. %, the molecular weight was Mn=69000; Mw=134000 and the cyclopentadiene content in the polymer was 3.7 mol %.

EXAMPLE 8

The methodology of Example 3 was repeated except that 9.3 mg tert-butylchloride was added to the reaction mixture before starting the reaction. The polymer yield was 70.5 wt. %, the molecular weight was Mn=65000; Mw=310000 and the methylcyclopentadiene content in the polymer was 2.6 mol %.

EXAMPLE 9

The methodology of Example 4 was repeated except that 9.3 mg tert-butylchloride was added to the reaction mixture before starting the reaction. The polymer yield was 53.1 wt. %, the molecular weight was Mn=32000; Mw=120000. The cyclopentadiene content in the polymer was 1.8 mol % and the methylcyclopentadiene content in the polymer was 2.1 mol %.

EXAMPLE 10

The methodology of Example 5 was repeated except that 12.7 mg benzylchloride was added to the reaction mixture before starting the reaction. The polymer yield was 27.0 wt. %, the molecular weight was Mn=91000: Mw=176000 and the cyclopentadiene content in the polymer was 5.6 mol %.

EXAMPLE 11

The methodology of Example 5 was repeated except that 14.1 mg 4-methylbenzylchloride was added to the reaction mixture before starting the reaction. The polymer yield was 20.2 wt. %, the molecular weight was Mn=115000; Mw=185000 and the cyclopentadiene content in the polymer was 6.2 mol %.

EXAMPLE 12

The methodology of Example 5 was repeated except that 6.2 mg cis-1,4-dichloro-2-butene was added to the reaction mixture before starting the reaction. The polymer yield was 52.9 wt. %, the molecular weight was Mn=72000; Mw=263000 and the cyclopentadiene content in the polymer was 2.8 mol %.

EXAMPLE 13

The methodology of Example 5 was repeated except that 6.2 mg trans-1,4-dichloro-2-butene was added to the reaction mixture before starting the reaction. The polymer yield was 100 wt. %, the molecular weight was Mn=193000; Mw=1429000 and the cyclopentadiene content in the polymer was 2.0 mol %.

EXAMPLE 14

The methodology of Example 5 was repeated except that 15.1 mg 4-vinylbenzylchloride was added to the reaction mixture before starting the reaction. The polymer yield was 86.7 wt. %, the molecular weight was Mn=62000; Mw=140000 and the cyclopentadiene content in the polymer was 2.3 mol %.

EXAMPLE 15

The methodology of Example 5 was repeated except that 15.1 mg α,α'-dichloro-pxylene was added to the reaction mixture before starting the reaction. The polymer yield was 99.5 wt. %, to the molecular weight was Mn=84000; Mw=202000 and the cyclopentadiene content in the polymer was 2.1 mol %.

EXAMPLE 16

The methodology of Example 5 was repeated except that 9.7 mg α,α,α',α'-tetramethyl-1,4-benzenedimethanol was added to the reaction mixture before starting the reaction. The polymer yield was 25.4 wt. %, the molecular weight was Mn=87000; Mw=215000 and the cyclopentadiene content in the polymer was 6.0 mol %.

EXAMPLE 17

At −30° C., 0.0267 g $AlCl_3$ (purity 99.99%, <100 ppm $H_2O$) were dissolved in 55.4 mL methylchloride (<20 ppm $H_2O$) to form the catalyst solution. The solution was stirred for 30 minutes at −30° C. and then cooled downed to −95° C.

In a 500 mL 4-necked reaction flask equipped with an overhead stirrer and two jacketed addition funnels, 150 mL of methylchloride was stirred at −93° C. After cooling down the addition funnels to −93° C., one was filled with 50 mL of the catalyst solution and the other was filled with 50 mL of a reaction solution consisting of 0.66 g cyclopentadiene, 38.5 mL isobutene and 11 mL methylchloride. The catalyst and reaction solutions were added to the reaction flask at a constant rate of 1.4 ml/min. All temperature changes during the reaction were followed with a thermocouple.

One minute after complete addition of the catalyst and reaction solutions, the reaction was slopped by adding 3 mL of a solution of NaOH in ethanol (1.0 wt. %) to the reaction mixture.

The polymerization was carried out in a Braun™ dry box under dry nitrogen atmosphere (<5 ppm $H_2O$, <20 ppm $O_2$).

Solvent, unreacted monomers and ethanol were removed under vacuum and the polymer yield was determined by gravimetry to 12.3 wt. %.

By dissolving in hexane and reprecipitation from ethanol, the polymer was cleaned. After 3 days of drying in a vacuum oven at room temperature, the molecular weight, determined by GPC (Rl-detection), was Mn=101000; Mw=184000 and the cyclopentadiene content, determined by $^1$H-NMR spectroscopy, in the polymer was 7.3 mol. %.

This Example represents the semicontinuous control reaction without addition of an accelerator, and thus is provided for comparative purposes only.

EXAMPLE 18

The methodology of Example 17 was repeated except that the reaction mixture consisted of 0.66 g cyclopentadiene, 38.5 mL isobutene, 9.3 mg tert-butylchloride and 11 mL methylchloride. The polymer yield was 73.6 wt. %, the molecular weight was Mn=75000; Mw=210000; and the cyclopentadiene content in the polymer was 2.5 mol-%.

EXAMPLE 19

The methodology of Example 17 was repeated except that the reaction mixture consisted of 0.33 g cyclopentadiene, 0.40 g methylcyclopentadiene, 38.5 mL isobutene and 11 mL methylchloride. The polymer yield was 26.5 wt %, the molecular weight was Mn=94000; Mw=198000; the cyclopentadiene content in the polymer was 2.6 mol-% and the methylcyclopentadiene content was 5.8 mol-%.

This Example represents the semicontinuous control reaction without addition of an accelerator, and thus is provided for comparative purposes only.

EXAMPLE 20

The methodology of Example 17 was repeated except that the reaction mixture consisted of 0.33 g cyclopentadiene, 0.40 g methylcyclopentadiene, 38.5 mL isobutene, 9.3 mg tert-butylchloride and 11 mL methylchloride. The polymer yield was 61.1 wt. %, the molecular weight was Mn=98000; Mw=205000; the cyclopentadiene content in the polymer was 1.3 mol-% and the methylcyclopentadiene content was 2.8 mol-%.

EXAMPLE 21

The methodology of Example 17 was repeated except that the reaction mixture consisted of 0.81 g methylcyclopentadiene, 38.5 mL isobutene and 11 mL methylchloride. The polymer yield was 26.7 wt. %, the molecular weight was Mn=151000; Mw=397000; and the methylcyclopentadiene content was 5.7 mol-%.

This Example represents the semicontinuous control reaction without addition of an accelerator, and thus is provided for comparative purposes only.

EXAMPLE 22

The methodology of Example 17 was repeated except that the reaction mixture consisted of 0.81 g methylcyclopentadiene, 38.5 mL isobutene, 9.3 mg tert-butylchloride and 11 mL methylchloride. The polymer yield was 56.3 wt. %, the molecular weight was Mn=135000; Mw365000; and the methylcyclopentadiene content was 2.8 mol-%.

In each of the foregoing Examples, the weight ratio of solvent to monomers was 8.4, the wt. % of the catalyst solution was 0.047, the weight ratio of the catalyst solution to the monomers was 1.96, the reaction temperature was −93° C. and the reaction time was 20 minutes in Examples 1–16 and 36 minutes in Examples 17–22. Various other parameters of the process of the foregoing Examples and various properties of the polymers produced in the Examples are provided in the attached tables (Note: PDI= polydispersity index). The results reported in the attached tables, illustrate advantages of the present process. Specifically, higher polymer yields and catalyst efficiencies are achieved using the accelerator (i.e., the activator) of the present process when compared to not using it. This is especially seen in Examples 17–22 where there is a lack of a significant decrease of Mw for Examples 18, 20 and 22 compared to Examples 17, 19 and 21, respectively.

While the invention has been described hereinabove with reference to various preferred embodiments and specific Examples, it will be clearly understood by those of skill in the art that modifications to and variations of the preferred embodiments and specific Examples are possible which do not depart from the spirit and scope of the present invention. Accordingly, it is contemplated that such modifications to and variations of the preferred embodiments and specific Examples are encompassed by the invention.

| Example | Reaction | Wt. % IB in monomer feed | Wt. % CP in monomer fed | Wt. % MeCP in Monomer feed | wt.-% accelerator in monomer feed | Type of accelerator |
|---|---|---|---|---|---|---|
| 1 | Batch | 97.6 | 2.4 | 0 | 0 | none |
| 2 | Batch | 94.2 | 5.8 | 0 | 0 | none |
| 3 | Batch | 97.2 | 0 | 2.8 | 0 | none |
| 4 | Batch | 97.5 | 1.1 | 1.4 | 0 | none |
| 5 | Batch | 97.6 | 2.4 | 0 | 0.032 | tert-butylchloride |
| 6 | Batch | 97.6 | 2.4 | 0 | 0.065 | tert-butylchloride |
| 7 | Batch | 97.6 | 2.4 | 0 | 0.016 | tert-butylchloride |
| 8 | Batch | 97.2 | 0 | 2.8 | 0.032 | tert-butylchloride |
| 9 | Batch | 97.5 | 1.1 | 1.4 | 0.032 | tert-butylchloride |
| 10 | Batch | 97.6 | 2.4 | 0 | 0.044 | benzylchloride |
| 11 | Batch | 97.6 | 2.4 | 0 | 0.049 | 4-methylbenzylchloride |
| 12 | Batch | 97.6 | 2.4 | 0 | 0.022 | cis-1,4-dichloro-2-butene |
| 13 | Batch | 97.6 | 2.4 | 0 | 0.022 | trans-1,4-dichloro-2-butene |
| 14 | Batch | 97.6 | 2.4 | 0 | 0.053 | 4-vinylbenzylchloride |
| 15 | Batch | 97.6 | 2.4 | 0 | 0.031 | α,α'-dichloro-p-xylene |
| 16 | Batch | 97.6 | 2.4 | 0 | 0.035 | α,α,α',α'-tetramethyl-1,4-benzenedimethanol |
| 17 | Semi | 97.6 | 2.4 | 0 | 0 | none |
| 18 | Semi | 97.6 | 2.4 | 0 | 0.032 | tert-butylchloride |
| 19 | Semi | 97.5 | 1.1 | 1.4 | 0 | none |
| 20 | Semi | 97.5 | 1.1 | 1.4 | 0.032 | tert-butylchloride |
| 21 | Semi | 97.2 | 0 | 2.8 | 0 | none |
| 22 | Semi | 97.2 | 0 | 2.8 | 0.032 | tert-butylchloride |

| Example | Yield (%) | Catalyst efficiency (kg polymer/g cat) | Mw | PDI | Mol % CP in polymer | Mol % MeCP in polymer | Gel content |
|---|---|---|---|---|---|---|---|
| 1 | 16.3 | 0.17 | 195000 | 1.5 | 7.2 | 0.0 | not visible |
| 2 | 13.9 | 0.15 | 130000 | 2.5 | 17.9 | 0.0 | not visible |
| 3 | 49.0 | 0.52 | 327000 | 5.7 | 0.0 | 4.0 | not visible |
| 4 | 25.8 | 0.28 | 182000 | 3.5 | 2.8 | 3.5 | not visible |
| 5 | 77.4 | 0.82 | 109000 | 2.3 | 2.9 | 0.0 | not visible |
| 6 | 98.5 | 1.07 | 75000 | 2.0 | 1.9 | 0.0 | not visible |
| 7 | 50.3 | 0.54 | 134000 | 1.9 | 3.7 | 0.0 | not visible |
| 8 | 70.5 | 0.76 | 310000 | 4.8 | 0.0 | 2.6 | not visible |
| 9 | 53.1 | 0.57 | 120000 | 3.8 | 1.8 | 2.1 | not visible |
| 10 | 27.0 | 0.29 | 176000 | 1.9 | 5.6 | 0.0 | not visible |
| 11 | 20.2 | 0.22 | 185000 | 1.6 | 6.2 | 0.0 | not visible |
| 12 | 52.9 | 0.56 | 263000 | 3.7 | 2.8 | 0.0 | not visible |
| 13 | 100.0 | 1.07 | 1429000 | 7.4 | 2.0 | 0.0 | not visible |
| 14 | 86.7 | 0.92 | 140000 | 2.3 | 2.3 | 0.0 | not visible |
| 15 | 99.5 | 1.05 | 202000 | 2.4 | 2.1 | 0.0 | not visible |

-continued

| Example | Yield (%) | Catalyst efficiency (kg polymer/g cat) | Mw | PDI | Mol % CP in polymer | Mol % MeCP in polymer | Gel content |
|---|---|---|---|---|---|---|---|
| 16 | 25.4 | 0.27 | 215000 | 2.5 | 6.0 | 0.0 | not visible |
| 17 | 12.3 | 0.13 | 184000 | 1.8 | 7.3 | 0.0 | not visible |
| 18 | 73.6 | 0.78 | 210000 | 2.8 | 2.5 | 0.0 | not visible |
| 19 | 26.5 | 0.28 | 198000 | 2.1 | 2.6 | 5.8 | not visible |
| 20 | 61.1 | 0.65 | 205000 | 2.1 | 1.3 | 2.8 | not visible |
| 21 | 26.7 | 0.28 | 397000 | 2.6 | 0.0 | 5.7 | not visible |
| 22 | 56.3 | 0.60 | 365000 | 2.7 | 0.0 | 2.8 | not visible |

What is claimed is:

1. A slurry process for producing a copolymer of an isoolefin and at least one other comonomer comprising the step of polymerizing a reaction mixture comprising an isoolefin, a catalyst having the formula $AlY_3$ wherein Y is a halogen and at least one of a cycloconjugated multiolefin and an unconjugated cyclic olefin in the presence of an activator selected from the group consisting of a carbo cation producing species, a silica cation producing species and mixtures thereof.

2. The process defined in claim 1, wherein the activator is a carbo cation producing species having the formula:

wherein $R^1$ is a $C_1$–$C_{40}$ hydrocarbon, optionally substituted with one or more heteroatoms, and X is selected from the group consisting of halogen, —OH and —$OR^2$, wherein $R^2$ is the same or different as $R^1$ and is a $C_1$–$C_{40}$ hydrocarbon, optionally substituted with one or more heteroatoms.

3. The process defined in claim 2, wherein each of $R^1$ and $R^2$ is a $C_1$–$C_{40}$ straight chain or branched alkyl group, optionally having one or more unsaturations.

4. The process defined in claim 2, wherein each of $R^1$ and $R^2$ is a substituted or unsubstituted $C_5$–$C_{40}$ aryl group.

5. The process defined in claim 2, wherein each of $R^1$ and $R^2$ is a substituted or unsubstituted $C_3$–$C_{40}$ cycloalkyl group.

6. The process defined in claim 2, wherein X is selected from the group consisting of Cl, Br and I.

7. The process defined in claim 6, wherein X is Cl.

8. The process defined in claim 2, wherein X is OH.

9. The process defined in claim 2, wherein X is $OCH_3$.

10. The process defined in claim 1, wherein the activator has the formula:

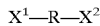

wherein R is a $C_1$–$C_{40}$ hydrocarbon, optionally substituted with one or more heteroatoms, and $X^1$ and $X^2$ are the same or different and each is a halogen, —OH or —$OR^3$, wherein $R^3$ is a $C_1$–$C_{40}$ hydrocarbon, optionally substituted with one or more heteroatoms.

11. The process defined in claim 10, wherein R is a $C_1$–$C_{40}$ straight chain or branched alkyl group, optionally having one or more unsaturations.

12. The process defined in claim 10, wherein R is substituted or unsubstituted $C_5$–$C_{40}$ aryl group.

13. The process defined in claim 10, wherein R is a substituted or unsubstituted $C_3$–$C_{40}$ cycloalkyl group.

14. The process defined in claim 10, wherein $R^3$ is a $C_1$–$C_{40}$ straight chain or branched alkyl group, optionally having one or more unsaturations.

15. The process defined in claim 10, wherein $R^3$ is substituted or unsubstituted $C_5$–$C_{40}$ aryl group.

16. The process defined in claim 13, wherein $R^3$ is a substituted or unsubstituted $C_3$–$C_{40}$ cycloalkyl group.

17. The process defined in claim 10, wherein $X^1$ and $X^2$ are selected from the group consisting of Cl, Br and I.

18. The process defined in claim 17, wherein both $X^1$ and $X^2$ are Cl.

19. The process defined in claim 1, wherein the activator comprises allyl chloride.

20. The process defined in claim 1, wherein the activator comprises tert-butylchloride.

21. The process defined in claim 1, wherein the activator comprises:

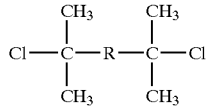

wherein R is $C_1$–$C_{40}$ hydrocarbon, optionally substituted with one or more heteroatoms.

22. The process defined in claim 1, wherein the activator is selected from the group consisting of:

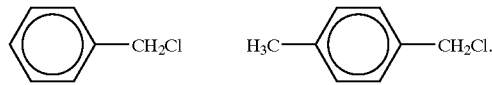

23. The process defined in claim 1, wherein the activator is:

24. The process defined in claim 1, wherein the activator is selected from the group consisting of cis and trans isomers of:

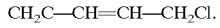

25. The process defined in claim 1, wherein activator has the formula:

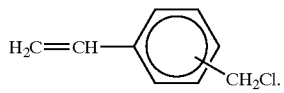

26. The process defined in claim 1, wherein the activator is a silica cation producing species having the formula:

wherein $R^4$, $R^5$ and $R^6$ are the same or difference and each is a $C_1$–$C_{40}$ hydrocarbon, optionally substituted with one or more heteroatoms and X is a halogen.

27. The process defined in claim 26, wherein each of $R^4$, $R^5$ and $R^6$ is a $C_1$–$C_{40}$ straight chain or branched alkyl group, optionally having one or more unsaturations.

28. The process defined in claim 26, wherein each of $R^4$, $R^5$ and $R^6$ is a substituted or unsubstituted $C_5$–$C_{40}$ aryl group.

29. The process defined in claim 26, wherein each of $R^4$, $R^5$ and $R^6$ is a substituted or unsubstituted $C_3$–$C_{40}$ cycloalkyl group.

30. The process defined in claim 26, wherein X is selected from the group consisting of Cl, Br and I.

31. The process defined in claim 1, wherein the activator comprises trimethyl silyl chloride.

32. The process defined in claim 1, wherein said isoolefin is selected from the group consisting of isobutylene, 2-methyl-1-butene, 3-methyl-1-butene, 4-methyl-1-pentene and mixtures thereof.

33. The process defined in claim 1, wherein the cyclo-conjugated multiolefin is selected from the group consisting of cyclopentadiene, 1-methylcyclopentadiene, 2-methylcyclopentadiene, 1,3-dimethylcyclopentadiene, 1,3-cyclohexadiene, 1-methyl-1,3-cyclohexadiene, 1-methylene-2-cyclohexene, 2-methyl-1,3-cyclohexadiene, 1,3-dimethyl-1,3-cyclohexadiene and mixtures thereof.

34. The process defined in claim 1, wherein the unconjugated cyclic olefin comprises β-pinene.

35. The process defined in claim 1, wherein the catalyst comprises $AlCl_3$.

\* \* \* \* \*